B. BAYLISS.
Metallurgic-Furnace.

No. 160,140.

2 Sheets--Sheet 1.

Patented Feb. 23, 1875.

Witnesses:
A. C. Johnston
James J. Johnston

Inventor:
Benjamin Bayliss

THE GRAPHIC CO.PHOTO-LITH.39 & 41 PARK PLACE.N.Y.

2 Sheets--Sheet 2.

B. BAYLISS.
Metallurgic-Furnace.

No. 160,140. Patented Feb. 23, 1875.

Witnesses:
A. C. Johnston
James J. Johnston

Inventor:
Benjamin Bayliss

UNITED STATES PATENT OFFICE.

BENJAMIN BAYLISS, OF PITTSBURG, PENNSYLVANIA.

IMPROVEMENT IN METALLURGIC FURNACES.

Specification forming part of Letters Patent No. 160,140, dated February 23, 1875; application filed November 6, 1874.

*To all whom it may concern:*

Be it known that I, BENJAMIN BAYLISS, of Pittsburg, in the county of Allegheny and State of Pennsylvania, have invented a certain new and useful Improvement in Metallurgic Furnaces for the Manufacture of Iron and Steel, for which substantially the same invention I secured Letters Patent of Great Britain, dated March 14, 1867, and numbered 2,374; and I do hereby declare that the following is a full and exact description thereof, reference being had to the accompanying drawings, and to the letters of reference marked thereon.

My invention relates to an improvement in metallurgic furnaces for the manufacture of iron and steel, and consists in the combination of a melting-furnace, refining-furnace, and puddling-furnace, the melting-furnace communicating with the refining-furnace and the refining-furnace communicating with the puddling-furnace; or, a furnace having melting, refining, and puddling compartments which communicate with each other, whereby the iron is melted in one furnace or compartment, and transferred to another furnace or compartment and then refined, after which it is transferred to another furnace or compartment and subjected to the puddling process.

Figure 1:
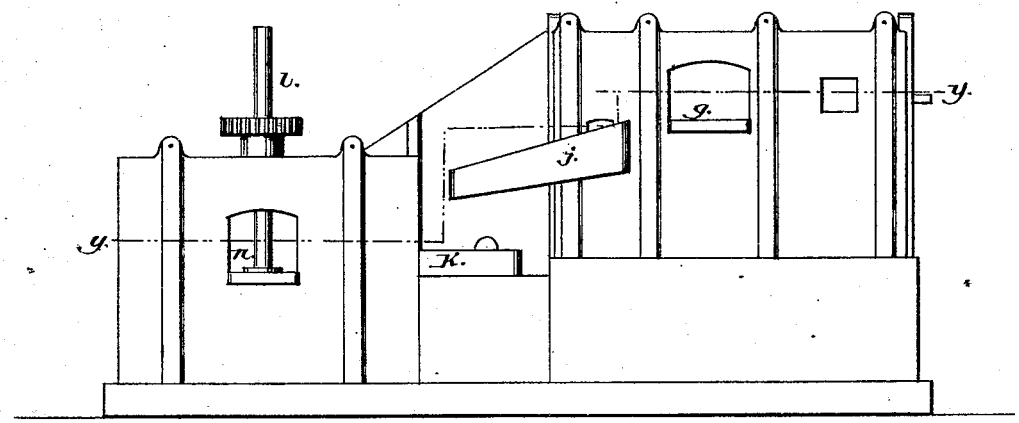
Figure 2:
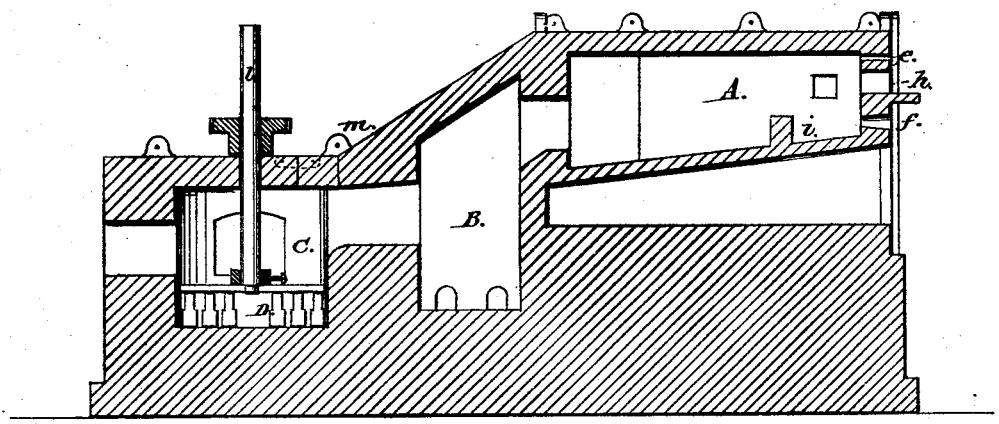
Figure 3:
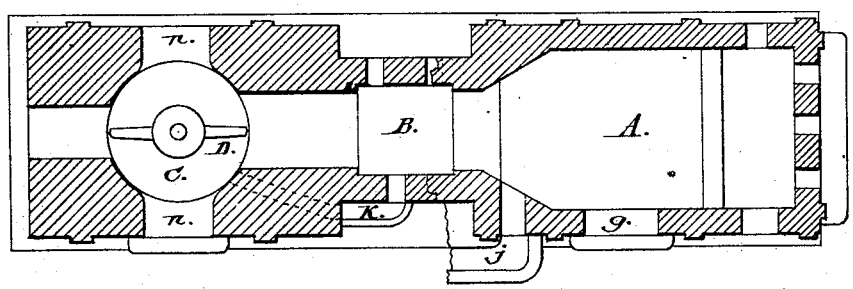
Figure 5:
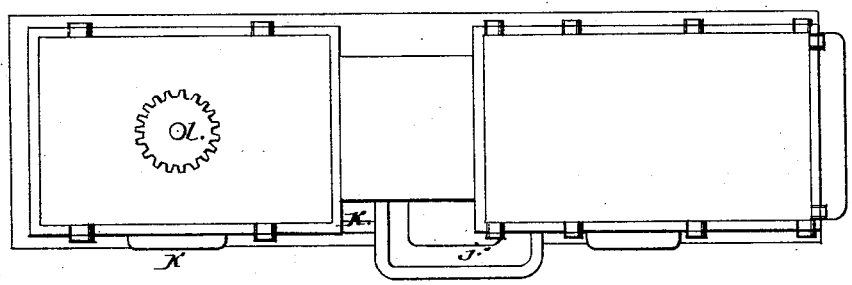
Figure 4:
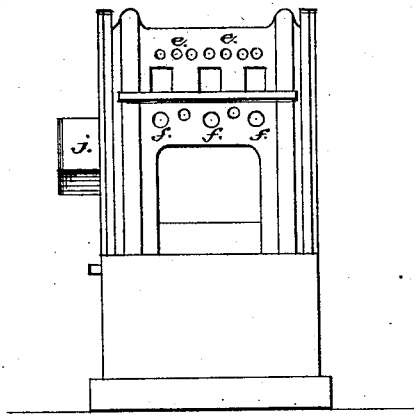

In the accompanying drawings, which form part of my specification, Figure 1 is a side elevation of my improvement in metallurgic furnaces for the manufacture of iron and steel. Fig. 2 is a vertical and longitudinal section of the same. Fig. 3 is a horizontal section of the same at line $y$ of Fig. 1. Fig. 4 is an end elevation of the same. Fig. 5 is a top view or plan of the same.

In the accompanying drawings, A represents the melting-compartment, and is furnished with a charging-door, $g$, fire-door $h$, and fire-chamber $i$, the floor of which is close—that is to say, it is a fire-chamber without the ordinary grate or grate-bars. Near the crown of the fire-chamber $i$ are a series of air-inlets, $e$, and near its floor or bottom are a series of air-inlets, $f$, at which point a suitable blast device may be connected. Any suitable fuel may be used, either solid, liquid, or gaseous, and a complete combustion, with intense heat and great economy of fuel, will be the result therefrom. The waste heat escaping from the melting of one charge in the furnace A, through the several openings of the chambers A, B, and C, is utilized in the refining and puddling chambers before it finally enters the smoke-stack. B is the refining chamber or compartment, furnished with water-blocks, blast-tuyere iron pipes and the other appendages common to a refining fire or furnace. The melting-compartment communicates with the refining-compartment B through the medium of a trough or way, $j$, whereby the melted iron from the compartment A may be conducted to the refining-compartment B at the desired intervals of time. C represents the puddling-compartment, which communicates with the refining-compartment by means of a trough or way, K, whereby the refined iron may be conducted at suitable periods of time into the puddling-compartment, where it may be manipulated and balled for the squeezer or hammer, in and by the ordinary hand labor and rabble, or by means of the rotating rabble D, arranged on the lower end of the vertical shaft $l$, which is rotated by suitable gearing and power. The shaft $l$ is pivoted in the crown of the puddling-compartment, which crown may be constructed in sections and hinged as indicated at $m$, which sections may be water-boxes, with their under surface suitably lined with fire-brick or other suitable material. The puddling-compartment C is furnished with doors $n$ for the withdrawing of the puddled iron. The puddling-compartment C communicates with a stack of the ordinary kind, and furnished with the damper common to stacks of furnaces used in the manufacture of iron.

The details not herein described I leave to those skilled in the manufacture of iron.

The operation of my improvement in furnaces for the manufacture of iron may be briefly stated as follows: The pig-iron is melted in the compartment A, from which it is conducted into the compartment B and subjected to the refining process, after which the refined iron is conducted into the compartment C, where it is subjected to the puddling process, after which it is withdrawn from the compartment C and subjected to the squeezing or hammering process, and subsequently rolled into merchantable iron or worked into steel by any known process.

Economy of fuel, facilitating the process of manufacturing of the raw pig-iron into wrought-iron, with great improvement in the quality of the worked product, and a large saving of time and labor, are advantages and results obtained by the use of the invention hereinbefore described.

Having thus described the nature, construction, and operation of my improvement, what I claim as of my invention is—

1. The combination of the melting-furnace A, refining-furnace B, and puddling-furnace C, said furnaces communicating and operating with relation to each other substantially in the manner herein described, and for the purpose set forth.

2. A puddling-furnace, provided with a rotary puddling-tool, in combination with a refining and melting furnace, arranged and operating with relation to each other substantially as herein described, and for the purpose set forth.

BENJAMIN BAYLISS.

Witnesses:
A. C. JOHNSTON,
JAMES J. JOHNSTON.